July 5, 1966  L. DUPRAS  3,258,993
SELF-LOCKING DIFFERENTIAL
Filed Dec. 11, 1962  2 Sheets-Sheet 2
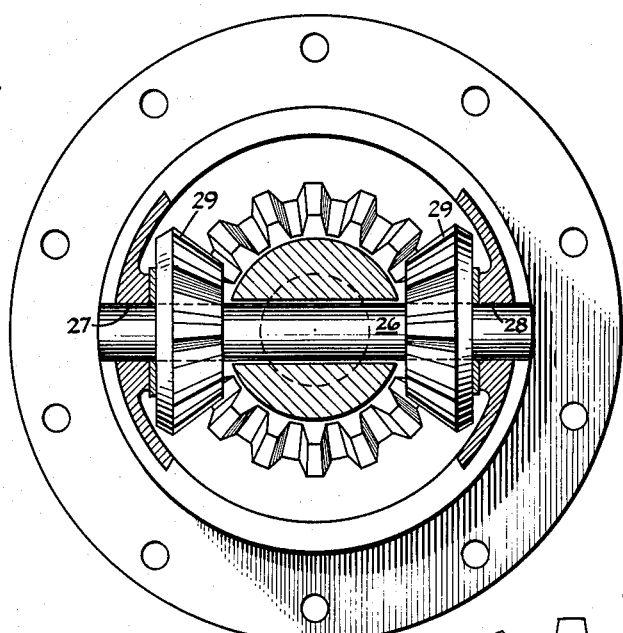
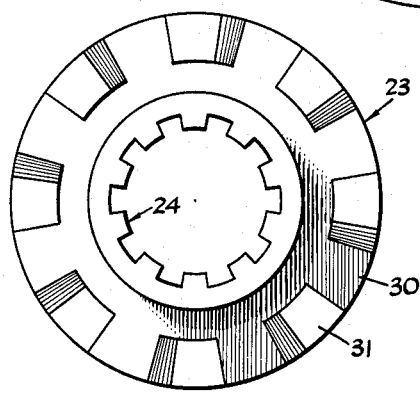
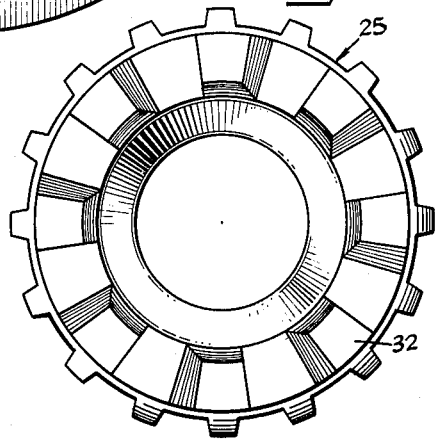
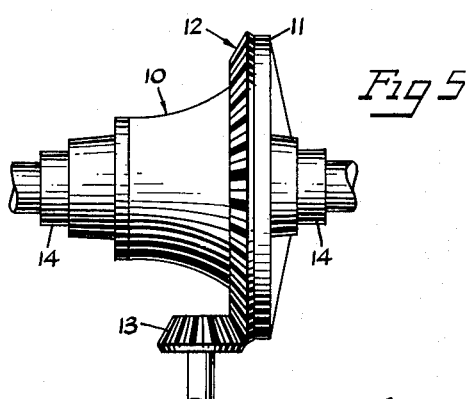
INVENTOR.
Louis Dupras
BY
ATTORNEYS

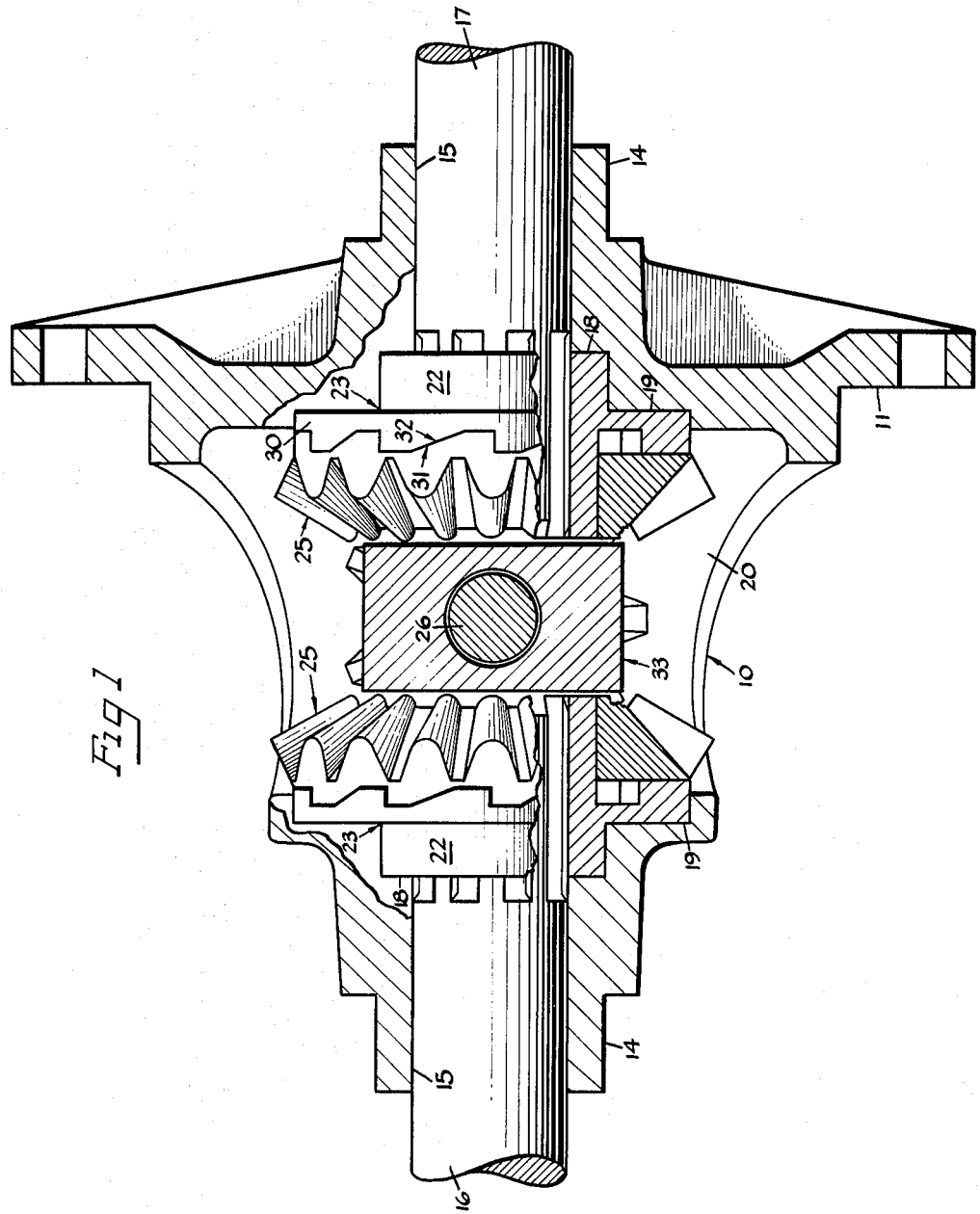

3,258,993
SELF-LOCKING DIFFERENTIAL
Louis Dupras, Marquette, Mich., assignor to The First National Bank of Waukegan, Waukegan, Ill.
Filed Dec. 11, 1962, Ser. No. 243,772
3 Claims. (Cl. 74—711)

The present invention is directed to an improved self-locking torque transmission assembly and more particularly relates to a self-locking differential which is adapted for installation in road vehicles for transmitting torque from a drive shaft to the driving wheels thereof.

More particularly, my invention constitutes an improvement over the device disclosed in my Patent 2,945,400 which issued on July 19, 1960. The differential disclosed therein differs from prior differentials in many particulars but primarily in that the usual side gears are movable axially into binding engagement with the differential pinions to create a binding between the co-operating gears to effect co-rotatable movement of the opposed side gears and their respective axial shafts to lock the shafts together under certain conditions. In order to effect axial movement of the side gears into binding or locking engagement with the pinions, the side gears are threadedly mounted on the axial shafts so that a momentary differential rotational speed between the side gears and their respective axial shafts will act to move the side gears on the threaded shafts inwardly to lock with the pinions.

I have now improved the action of the above described differential by substituting complementary cam faces for the threading provided on my earlier differential and by providing means for limiting the inward movement of the side gears.

In accordance with my present invention, the opposed axial shafts have identically configurated radially extending cam heads splined to the ends thereof, and complementary cam surfaces are formed on the side gears so that when the side gears are freely mounted on the respective axial shafts in engagement with the cam heads relative rotation between the side gears and the heads will act to axially move the side gears. When the side gears move into binding engagement with the pinions a lock-up is effected and the opposed axial shafts move corotatably.

A limit block is fitted on the pinion shaft and is interposed between the side gears so as to limit the degree of axial movement of the side gears toward the pinions. By thus limiting axial movement of the side gears the possibility of a permanent lockup is obviated and a desired degree of lockup can be predetermined.

In view of the foregoing it is a principal object of my invention to provide an improved automatic locking means for a differential which is relatively simple in nature and which may be economically and readily manufactured.

Another object of my invention resides in the provision of a self-locking differential wherein complementary radially extending cam surfaces on the axle shafts and their respective side gears are effective to provide the "self-locking" feature of my invention.

Yet another object of my invention is directed to the provision of a self-locking differential employing identically configurated side gears and cam heads.

A still further and important object of my invention is directed to the provision of a limit block in the differential assembly which is so designed as to limit the degree of axial movement of the side gears toward binding engagement with the pinions.

These and other objects, features, and advantages of my invention will become apparent from time to time as the following specifications proceeds and with reference to the accompanying drawings, wherein:

FIGURE 1 is a vertical sectional view taken through a differential constructed in accordance with my invention;

FIGURE 2 is another vertical sectional view taken through the differential shown in FIGURE 1 but taken along a plane perpendicular to the plane of the view of FIGURE 1;

FIGURE 3 is a plan view of a cam head constructed in accordance with my invention;

FIGURE 4 is a plan view of a side gear showing cam surfaces thereon complementary to the cam surfaces on the cam head shown in FIGURE 3; and FIGURE 5 is a view of a differential assembly showing the cooperating ring gear and drive pinion.

A differential constructed in accordance with my invention comprises generally a differential case 10 (FIGURE 5) which has an annular flange 11 formed integrally therewith to which is bolted a ring gear 12. A pinion gear 13 is mounted on the shank end of the drive shaft of a road vehicle or the like and drivingly engages the ring gear 12 to effect rotatable movement of the ring gear 12 from the differential case 10 about an axis perpendicular to the axis of the drive shaft. The differential case 10 has cylindrical bearing seats 14 formed at opposite ends thereof which are arranged to be journalled within a differential housing in the well known manner.

Coaxial bores 15 are formed within the case 10 at the rotational axis thereof and have axle shafts 16 and 17 journalled therein. The bores 15 open to intermediate and enlarged wells 18 and 19, respectively, which, in turn, open to the hollow interior 20 of the case 10.

The inner ends of the shafts 16, 17 are axially splined and have the splined hubs 22 of cam heads 23 mounted thereon so that the shafts and heads are corotatable with one another. The splines 24 on a cam head 23 are shown in FIGURE 3.

One of two identical side gears is shown in FIGURE 4. The side gear 25 has a smooth cylindrical surface at the interior thereof so that it can be mounted on the inner end of the shaft 16 for free rotational movement relative thereto. An identically configurated side gear 25 is mounted on the inner end of the shaft 17.

A pinion shaft 26 has its opposite ends journalled in diametrically opposed bores 27, 28 formed in the case 10 and has a pair of pinions 29 freely mounted thereon. The pinions are disposed in mesh with the side gears so that they will be effective to transmit rotary movement of the differential case 10 equally to the side gears 18 to thereby drive the axle shafts 16 and 17 at the same speed. In the ordinary differential, when there is a differential in the resistance to rotation of the respective axle shafts 16, 17 the pinion gears 29 act to transmit driving torque from the differential case 10 to that side gear subjected to the least resistance to rotation and its respective axle shaft. It is the object of a self locking differential however to so design the mechanism that when there is a relatively great differential in resistance to movement of the opposed axle shafts, the shafts will be locked together through the train of gears within the differential case so that driving torque will be transmitted from the case 10 equally to the two axle shafts. Now several arrangements can be provided to effect this end.

In the embodiment of my invention shown in the drawings the cam heads 23 include flat annular disks 30 which have bevelled cam surfaces 31 formed about the periphery thereof on the inwardly facing portions of the disks. The disks 30 ride within the enlarged wells 19 and are formed integrally with the hubs 22 which ride within the intermediate wells 18.

Complementary inclined cam surfaces 32 are formed on the outer or rear faces of the side gears 25 so that the front and rear faces respectively of the cam heads 23 and side gears 25 will mate perfectly as is shown in FIGURE 1.

It will be understood that the coaxially aligned axial shafts 16 and 17 are so disposed within the differential housing that no longitudinal movement thereof is permitted so that when the side gears 25 move rotatably relative to their respective axial shafts, they will move axially toward one another.

While it is true that the pinions 29 are in mesh with the side gears 25 at all times it must be understood that when the side gears are associated with the cam heads in the manner shown in FIGURE 1, the side gears are somewhat loosely in mesh with the pinion. When the side gears 25 move rotatably relative to their associated cam heads the cam surfaces 32 will ride along the cam surfaces 31 and the side gears will both be moved inwardly toward one another. Such inward movement of the side gears will of course be slight but will be sufficient to bind up the entire differential gear train so that the side gears and the pinions will be locked together. Obviously, when such locking action takes place the axle shafts 16, 17 will move together at the same speed.

In order to insure that the differential lockup will not be permanent, I have mounted a limit block 33 on the pinion shaft 26. This block is so dimensioned as to permit a sufficient amount of inward axial movement of the side gears 25 as is necessary to create a binding or locking of the differential gears but also so as to present an excessive amount of axial movement of the side gears 25. The limit block thus insures that permanent jamming or lockup of the differential gear train will not be effected and provides a means by which the manufacturer can effectively predetermine the maximum extent of gear binding in the differential.

*Operation*

Assuming that the drive shaft is rotating at a constant angular velocity the differential case will also be rotating at a constant angular velocity. Assuming also that the resistance to rotational movement of the opposed output shafts is equal these shafts also will rotate at an equal angular velocity and at the same angular velocity as the differential case 10.

If, however, the resistance to rotative movement of the shaft 16 is abruptly increased, the angular velocity of that shaft will tend to decrease substantially almost instantaneously. The angular momentum of the side gear 25 associated with that shaft will however tend momentarily to rotatably move that gear relative to its respective cam head and the gear will be moved axially into binding engagement with the pinions 29 until its inward movement is stopped by engagement of the inner face of the side gear 25 with the limit block 33. When the side gear 25 has moved into binding engagement with the pinions 29 the pinions will be prevented from rotating on the shaft 26 and the whole gear train will be locked together. Inasmuch as the pinions 29 are prevented from moving both side gears will be prevented from having rotation relative to the case so that the axle shafts 16 and 17 will each move at the same angular velocity as the case.

From the manufacturing standpoint, it is of the utmost importance to understand that in my invention the cam heads 23 are identically configurated and that the side gears 25 are also identically configurated. Parts may then be used interchangeably on each side of the differential case. In addition, because of the fact that the cam surfaces on the two cam heads are identical both in shape and in direction, locking of the differential gear train in the above-described manner may be effected irrespective of the direction of rotation of the differential case 10.

The differential gear train will of course stay locked in the above-described manner until a greater resistance is transferred to the opposite shaft from that which initially had the good resistance. Such resistance transference is quite common between opposed axle shafts in a road vehicle and occurs whenever minor turns of the vehicle are made in normal operation thereof. Consequently, the gear train would not, in practice, remain locked up for any great interval but would remain locked a sufficient length of time to permit the operator of the vehicle to move it out of snow, ice, or mud and the like.

It will of course be understood that this embodiment of my invention has been used for illustrative purposes only and that various modifications and variations in my invention may be effected without departing from the spirit and scope of the novel concepts thereof.

I claim as my invention:

1. A power transmission assembly comprising:
    a rotatable case having a pair of coaxial output shafts journaled therein along the rotational axis of said case,
    a pair of pinions rotatably mounted within said case on an axis normal to the axis of said shafts,
    flanges extending radially from said shafts within said case,
    side gears freely mounted for rotation on said shafts between said flanges and said pinions and disposed in engagement with said flanges,
    complementary cam surfaces formed on the mating surfaces of said flanges and gears,
    said cam surfaces being so formed as to effect an axial thrust of said side gears upon relative movement between said side gears and their respective mating flanges, said pinions interengaging each of said side gears, and means effecting rotatable movement of said case.

2. A power transmission assembly constructed in accordance with claim 1 wherein each of said flanges and each of said side gears, respectively, are identically configurated.

3. A power transmission assembly constructed in accordance with claim 1 wherein means other than said pinions are engageable with said side gears to limit axial movement of said side gears toward one another.

References Cited by the Examiner

UNITED STATES PATENTS

| | | |
|---|---|---|
| 1,540,247 | 6/1925 | Bowman. |
| 1,556,101 | 10/1925 | Goodhart _____ 74—711 |
| 2,932,218 | 4/1960 | Russell _____ 74—711 |

DAVID J. WILLIAMOWSKY, *Primary Examiner.*

DON A. WAITE, *Examiner.*

J. A. WONG, *Assistant Examiner.*